United States Patent [19]
Ganot et al.

[11] Patent Number: 6,095,608
[45] Date of Patent: Aug. 1, 2000

[54] VEHICLE SEAT FITTED WITH A HINGE MECHANISM

[75] Inventors: Denis Ganot, Caen; René Rohee, La Chapelle Biche, both of France

[73] Assignee: Bertrand Faure Equipments S.A., Boulogne, France

[21] Appl. No.: 09/115,472

[22] Filed: Jul. 15, 1998

[30] Foreign Application Priority Data

Jul. 15, 1997 [FR] France ................................. 97 08949

[51] Int. Cl.$^7$ ........................................................ B60N 2/02
[52] U.S. Cl. ................................... 297/367; 297/378.12
[58] Field of Search ............................... 297/367, 378.12

[56] References Cited

U.S. PATENT DOCUMENTS

| | | |
|---|---|---|
| 3,663,056 | 5/1972 | Turner . |
| 5,611,599 | 3/1997 | Baloche et al. . |
| 5,681,086 | 10/1997 | Baloche . |
| 5,755,491 | 5/1998 | Baloche et al. . |
| 5,779,313 | 7/1998 | Rohee . |

FOREIGN PATENT DOCUMENTS

| | | |
|---|---|---|
| 0 694 434 A1 | 1/1996 | European Pat. Off. . |
| 0 770 514 A1 | 5/1997 | European Pat. Off. . |
| 0 776 782 A2 | 6/1997 | European Pat. Off. . |
| 2 010 441 | 2/1970 | France . |
| 197 02 123 | 10/1997 | Germany . |
| 195 27 912 | 1/1998 | Germany . |

*Primary Examiner*—Peter M. Cuomo
*Assistant Examiner*—David E. Allred
*Attorney, Agent, or Firm*—Marshall, O'Toole, Gerstein, Murray & Borun

[57] ABSTRACT

A seat whose back is connected to the seat proper by first and second side hinges, each comprising two cheek-plates that can be locked together by toothed slugs under the control of a cam. The first hinge includes a resilient ring having notches in which the corresponding slugs can engage. The two hinges are interconnected by a link mechanism having lost motion so that actuating the cam of the first hinge unlocks the slugs in both hinges and also causes the slugs in the first hinge to disengage from the notches in the resilient ring, while actuating the cam of the second hinge does no more than release the slugs in both hinges while leaving the slugs of the first hinge engaged in their respective notches.

13 Claims, 6 Drawing Sheets

VEHICLE SEAT FITTED WITH A HINGE MECHANISM

FIELD OF THE INVENTION

The present invention relates to vehicle seats fitted with hinge mechanisms.

More particularly, the invention relates to a vehicle seat having first and second sides and comprising both a seat proper and a seat-back pivotally mounted relative to the seat proper by means of a hinge mechanism, said mechanism comprising a first hinge which is disposed on the first side of the seat and which comprises:

- first and second cheek-plates, one secured to the seat proper and the other to the seat-back, the cheek-plates being mounted to pivot relative to each other about an axis of rotation, the second cheek-plate of the first hinge being permanently secured to a first set of teeth extending over at least an arc of a circle centered on the axis of rotation and being radially inwardly directed;
- at least a first slug provided with a set of teeth suitable for co-operating with the first set of teeth, said first slug being guided in radial sliding relative to the first cheek-plate of the first hinge, between an engagement position where the set of teeth on the first slug co-operates with the first set of teeth to lock the first hinge, and a "disengaged" position where the first slug does not co-operate with said first set of teeth, said first slug further including a first peg projecting axially towards the second cheek-plate of the first hinge;
- a first cam for controlling the sliding of the first slug, said first cam being urged by resilient means towards a rest position in which said first cam places said first slug in its engaged position;
- a first control member for moving the first cam over a first angular stroke from its rest position to a first actuation position in which said first cam enables the first slug to slide towards its disengaged position;
- a circular guide mechanically linked with the second cheek-plate of the first hinge and co-operating with the first peg of the first slug so as to maintain said slug positively in its disengaged position when said first slug is in a predetermined range of angular positions relative to said circular guide, said circular guide having at least one gap in which the first peg of the first slug can engage when said first slug is not in said predetermined range of angular positions, then allowing said first slug to slide radially outwards to its engaged position; and
- first displacement means for displacing the first slug radially inwards from its engaged position to its disengaged position when the first cam passes from its rest position to its first actuation position.

BACKGROUND OF THE INVENTION

Document EP-A-0 770 514 describes an example of such a seat, in which the hinge mechanism can remain unlocked even after the control member has been released when titling the seat-back down forwards, e.g. to gain access to the back seats of the vehicle when the seat in question is a front seat. Thereafter, then when the seat-back is raised, the mechanism automatically locks itself again as soon as the first peg comes into register with the corresponding gap of the circular guide.

The seat described in that document gives complete satisfaction, however it nevertheless suffers from the drawback of always locking its seat-back in the same angular position whenever it is raised after being tilted down forwards, with this being independent of the prior adjustment of said seat-back.

The user of the seat must therefore readjust the inclination of the seat-back each time it is raised after being tilted down forwards.

Also, document EP-A-0 694 434 describes a seat provided with a hinge mechanism having toothed slugs, which mechanism enables the seat-back to be tilted down forwards and to automatically lock itself again in its previously-adjusted position.

The toothed slugs of the mechanism which enable the inclination of the seat-back to be adjusted engage in a set of teeth which is itself movable relative to the second cheek-plate and which can be secured to the second cheek-plate via other toothed slugs.

Under such circumstances, the two cheek-plates are therefore connected to each other via two stages of toothed slugs, which tends to reduce the strength of the mechanism, or to make it necessary to increase the weight and the cost of the mechanism in order to obtain high mechanical strength.

OBJECTS AND SUMMARY OF THE INVENTION

An object of the present invention is therefore to propose a seat provided with a hinge mechanism of the kind described in document EP-A-0 770 514, but which is capable of locking itself again automatically in the most-recently adjusted position for the seat-back when said seat-back is raised after being tilted down forwards, while being as strong as the mechanism of document EP-A-0 770 514.

To this end, according to the invention, in a seat-back of the kind in question the circular guide is formed by a rim belonging to "memory" equipment which is mounted in the second cheek-plate of the first hinge to pivot with friction about the axis of rotation, the gap of the circular guide forming a radial guide in which the first peg of the first slug can slide radially, substantially without play in the circumferential direction;

wherein the hinge mechanism further comprises a second hinge disposed on the second side of the seat and comprising:

first and second cheek-plates, one secured to the seat proper and the other to the seat-back, said cheek-plates being mounted to pivot relative to each other about the above-mentioned axis of rotation, the second cheek-plate of the second hinge being permanently secured to a second set of teeth which extends over at least an arc of a circle centered on the axis of rotation and which is radially inwardly directed;

at least one second slug provided with a set of teeth suitable for co-operating with the second set of teeth, said slug being guided in radial sliding relative to the first cheek-plate of the second hinge, to slide between an engaged position where the set of teeth of the second slug co-operates with the second set of teeth to lock the second hinge, and a retracted position where the second slug does not co-operate with the second set of teeth;

a second cam for controlling sliding of the second slug, said second cam being urged by resilient means towards a rest position in which said second cam places said second slug in its engaged position;

a second control member for displacing the second cam over a second angular stroke from its rest position towards an actuation position in which said second cam enables the second slug to slide towards its retracted position; and second displacement means for displacing the second slug from its engaged position to its retracted position when the second cam passes from its rest position to its actuation position;

wherein the first and second cams are interconnected via a mechanical link having lost motion, which link is adapted:

for the first and second cams to be in their rest positions in the absence of the first and second control members being actuated;

for driving the second cam to its actuation position when the first cam is moved from its first actuation position by the first control member; and for driving the first cam from its rest position to a second actuation position over a third angular stroke that is smaller than the first angular stroke when said second cam is displaced by the second control member from its rest position to its actuation position; and wherein the first displacement means are adapted to displace the first slug radially inwards when the first cam is in its second actuation position, to occupy a retracted position in which said first slug is not engaged with the second set of teeth, but in which the first peg of said slug remains engaged in its radial guide.

By means of these dispositions, when the user of the seat seeks to adjust the inclination of the seat-back, the user acts on the second control member, thereby releasing the slugs of both hinges, the slug of the first hinge then holding the memory equipment relative to the first cheek-plate of the first hinge.

In contrast, when the user of the seat seeks to tilt the seat-back down forwards as far it will go, the user acts on the first control member which not only releases the slugs of both hinges, but also enables the first peg of the first slug to disengage itself from its radial guide. The memory equipment is then secured by friction relative to the second cheek-plate of the first hinge, in its position corresponding to the most recently adjusted position of the seat-back.

When the seat-back is tilted down forwards, the circular guide belonging to the memory equipment then slides against the first peg of the first slug, thereby holding the slugs of both cheek-plates in their retracted positions, even after the second control member has been released.

Thereafter, when the seat-back is tilted up again, the circular guide of the memory equipment slides again against the first peg of the first slug until said first peg is in register with its radial guide and engages therein, thus enabling the slugs of both hinges to return to their engaged positions: the seat-back is then again locked in the position as initially adjusted by the user.

It will also be observed that the hinge mechanism of the seat of the invention has very high mechanical strength because it has two hinges situated on opposite sides of the seat. Although that disposition is itself conventional, advantage is taken of it in this case to enable the seat-back to be folded down while remembering the most recent inclination adjustment of the seat-back without requiring the second hinge to have more parts than conventional hinges of the prior art, and requiring only one extra part in the first hinge.

In preferred embodiments of the invention, use may possibly also be made of one or more of the following dispositions:

the second cam travels at most over a fourth angular stroke when it is actuated by the second control member, said fourth angular stroke being not less than the first angular stroke, and the mechanical link with lost motion being adapted to entrain the first cam only after the second cam has travelled through a certain angular stroke referred to as the angular lost motion when said second cam is displaced by the second control member from its rest position, the first angular stroke being greater than the difference between the fourth angular stroke and the angular lost motion;

the second cam travels at most over a fourth angular stroke when it is actuated by the second control member, said fourth angular stroke being smaller than the first angular stroke, and the mechanical link with lost motion being adapted to drive the second cam only after the first cam has travelled through a certain angular stroke referred to as angular lost motion when said first cam is displaced by the first control member from its rest position, the first angular stroke being smaller than the sum of the fourth angular stroke plus the angular lost motion;

the memory equipment is constituted by a resilient ring which is engaged in the second cheek-plate of the first hinge by being clamped radially in the cheek-plate;

the second angular stroke is greater than the first angular stroke, the mechanical link having lost motion being adapted so that during actuation of the first control member the first cam travels over its first angular stroke from its rest position before the second cam has travelled over its second angular stroke;

the second hinge includes means for replacing the second slug in its engaged position before the first peg of the first slug re-engages in its radial guide when the seat-back is raised after being folded down by acting on the first control member;

an element secured to the first cam is designed to come into abutment against the first slug when the first slug is in its disengaged position and the first control member is released, in such a manner as then to prevent said first cam from returning to its rest position, said element secured to the first cam being adapted then to urge the first slug radially outwards so as to enable the first peg of said slug to engage in its radial guide when the seat-back is raised after having been folded down by acting on the first control member;

the first and second cams are linked respectively to first and second rigid plates which extend radially respectively between said cams and the corresponding second cheek-plates respectively overlying at least in part the first and second slugs, each of the first and second slugs including a respective "second" peg projecting axially towards the corresponding second cheek-plate and penetrating into a cutout formed in the corresponding plate, the cutouts of the first and second plates being respectively defined in a radially outward direction by first and second camming edges each co-operating with the corresponding second peg so as to displace the first and second slugs respectively radially inwards, respectively when the first and second cams are actuated;

the second slug includes a first peg projecting axially towards the second cheek-plate of the second hinge, the second plate including a projection projecting radially outwards and co-operating with the first peg of the second slug to hold said second slug in its engaged position so long as the first cam lies in a range of angular positions that do not correspond to the disengaged position of the first slug, said projection also being shaped so as to push the first peg of the second slug back radially outwards by the camming effect, thereby placing the second slug back in its engaged position before the first peg of the first slug again engages in its radial guide when the seat-back of the seat is raised after being folded down by actuating the first control member;

the second plate is linked to the second cam with a certain amount of angular lost motion in such a manner that said second plate can be moved relative to the second cam between first and second relative angular positions, the second plate being in its first angular position relative to the second cam when said second cam is in its rest position, and said second plate being firstly held fixed by friction until said second plate is in its second angular position relative to the second cam on each occasion that said second cam is displaced from its rest position towards its actuation position;

an element secured to the first cam is provided to come into abutment against the first slug when said first slug is pressed against the circular guide of the first hinge, and when the first control member is released, thereby preventing said second cam from then returning fully into its rest position, but allowing said first cam to move through a fifth angular stroke towards its rest position, said element secured to the first cam also urging the first slug radially outwards, and the fifth angular stroke being adapted so that when the first cam travels through said fifth angular stroke:

the second cam takes up the lost motion between said second cam and the second plate so as to place said second plate in its first angular position relative to the second cam; and the second cam also brings the projection of the second plate into the immediate vicinity of the first peg of the second slug;

the second slug slides vertically with its set of teeth being upwardly directed, said second slug being held merely by gravity in its retracted position when the first peg of the first slug is pressed against the circular guide of the first hinge, after the first control member has been released;

the second hinge includes at least one slug in addition to said second slug, said additional slug also having a set of teeth adapted to co-operate with the second set of teeth and being radially displaceable between an engaged position in which it engages said second set of teeth and a retracted position in which it does not co-operate with said second set of teeth, the additional slug having a peg which projects axially towards the second cheek-plate of the second hinge and which penetrates into an additional cutout formed in the second plate, said additional cutout being defined radially outwards by a camming edge which co-operates with the peg of the additional slug to displace said peg radially inwards when the second cam is displaced towards its actuation position, the camming edge of the additional cutout being adapted to hold the additional slug positively in the retracted position while the first peg of the first slug is pressed against the circular guide of the first hinge after the first control member has been released, and the second plate does not have an outer projection for co-operating with the additional slug; and a the memory equipment has an abutment projecting radially inwards in register with the radial guide in which the first peg of the first slug slides, said abutment being disposed on one side only of said radial guide so that when the first slug is in its disengaged position, the seat-back can be folded down forwards and then lifted back up until the first peg of the first slug encounters said abutment, after which said first peg can again engage in its radial guide.

BRIEF DESCRIPTION OF THE DRAWINGS

Other characteristics and advantages of the invention appear from the following description of an embodiment, given by way of non-limiting example and with reference to the accompanying drawings. In the drawings.

MORE DETAILED DESCRIPTION

In the various figures, the same references designate elements that are identical or similar.

Figure 1:
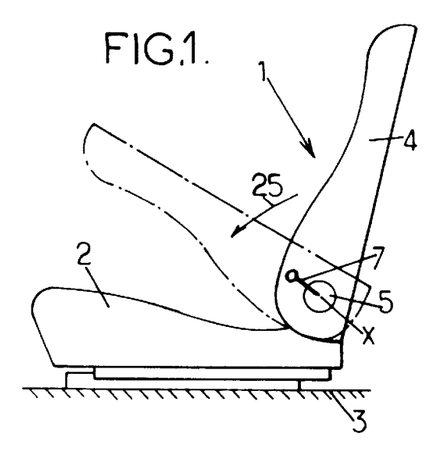
FIGS. 1 and 2 are respectively a side view and a rear view of a vehicle seat constituting an embodiment of the invention.
Figure 2:
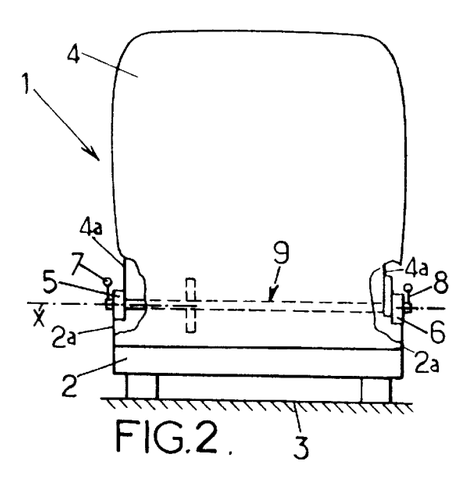

As shown diagrammatically in FIGS. 1 and 2, the invention relates to a vehicle seat 1, in particular a front seat of the motor vehicle, which seat comprises firstly a seat proper 2 mounted on the floor 3 of the vehicle, and secondly a seat-back 4 pivotally mounted on the seat proper 2 about a transverse horizontal axis X.

More precisely, the strength-member 4a of the seat-back is connected to the strength-member 2a of the seat, on either side of the seat via first and second hinges 5 and 6 which are respectively controlled by handles 7 and 8 and which are connected to each other by a link 9 extending horizontally and transversely relative to the seat.

Figure 3:
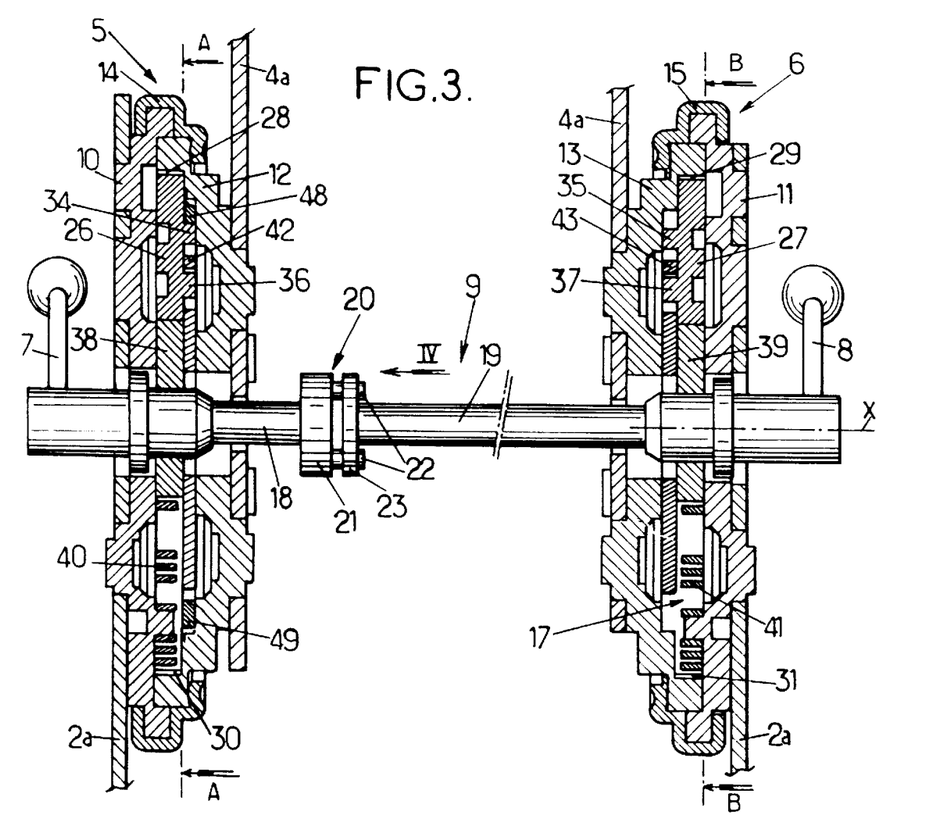
FIG. 3 is a vertical section view showing the two hinges which connect the seat-back to the seat proper of the seat of FIGS. 1 and 2.

As shown in greater detail in FIG. 3, each of the two hinges 5, 6 comprises:

a respective fixed metal cheek-plate 10, 11 secured to the strength-member 2a of the seat proper;

a respective moving metal cheek-plate 12, 13 secured to the strength-member 4a of the seat-back;

a respective metal ring 14, 15 crimped around the periphery of the fixed and moving cheek-plates and co-operating therewith to define a closed circular box; and respective slug locking devices 16, 17 contained in the corresponding box and adapted to prevent the moving cheek-plate from moving relative to the corresponding fixed cheek-plate so long as neither handle 7, 8 is actuated.

In addition, the link 9 interconnecting the two hinges 5, 6 is advantageously constituted by two rigid bar segments 18, 19 which are secured to the handles 7 and 8 respectively and which are connected to each other by a slack take-up device 20.

Figure 4:
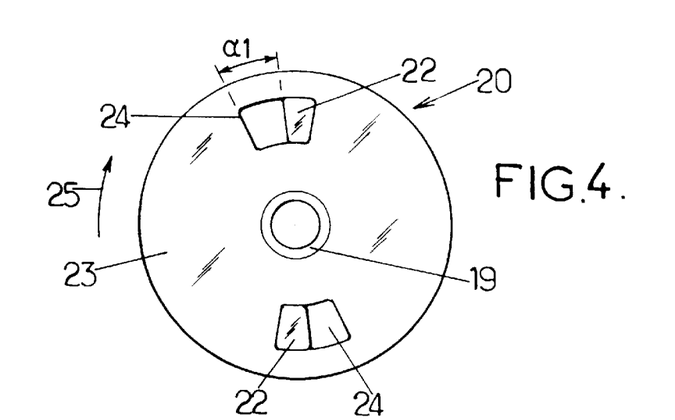
FIG. 4 is a detail view along arrow IV of FIG. 3.

In the example under consideration, the device 20 which can clearly be seen in FIGS. 3 and 4 comprises:

firstly, a radial plate 21 secured to bar segment 18 and extended axially towards bar segment 19 by two eccentric drive fingers 22; and secondly, a radial plate 23 secured to bar segment 19 and having two circularly arcuate oblong slots 24 in which the drive fingers 22 are engaged.

When both hinges 5 and 6 are in the rest position, the drive fingers 22 are in abutment against first ends of the oblong slots 24 so that:

when the handle 7 is actuated in angular direction 25, the drive fingers 22 drive the plate 23 immediately; and when the handle 8 is actuated in angular direction 25, the plate 23 can initially move freely over a certain angular stroke $\alpha_1$, referred to as "lost motion", before the second ends of the oblong slots 24 come into abutment against the drive fingers 22, thereby causing the plate 21 to be driven in direction 25.

Figure 5:
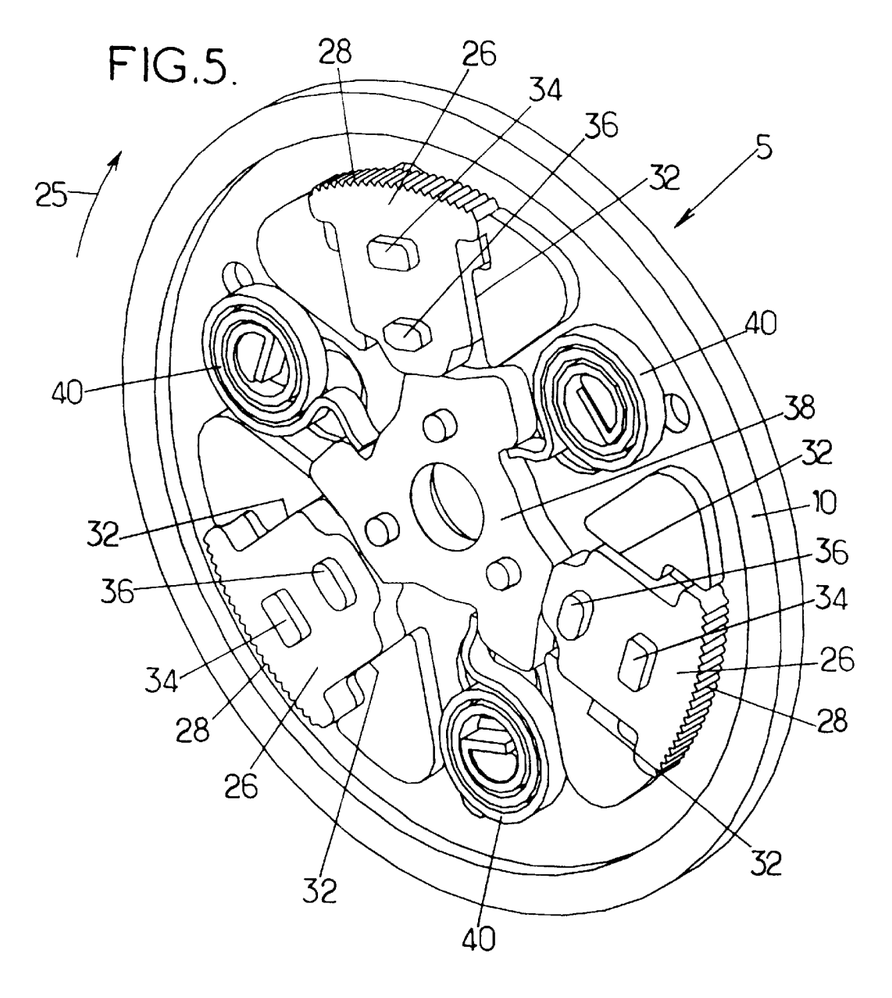
FIG. 5 is a perspective view showing a portion of the first hinge.
Figures 6, 7, 7A:
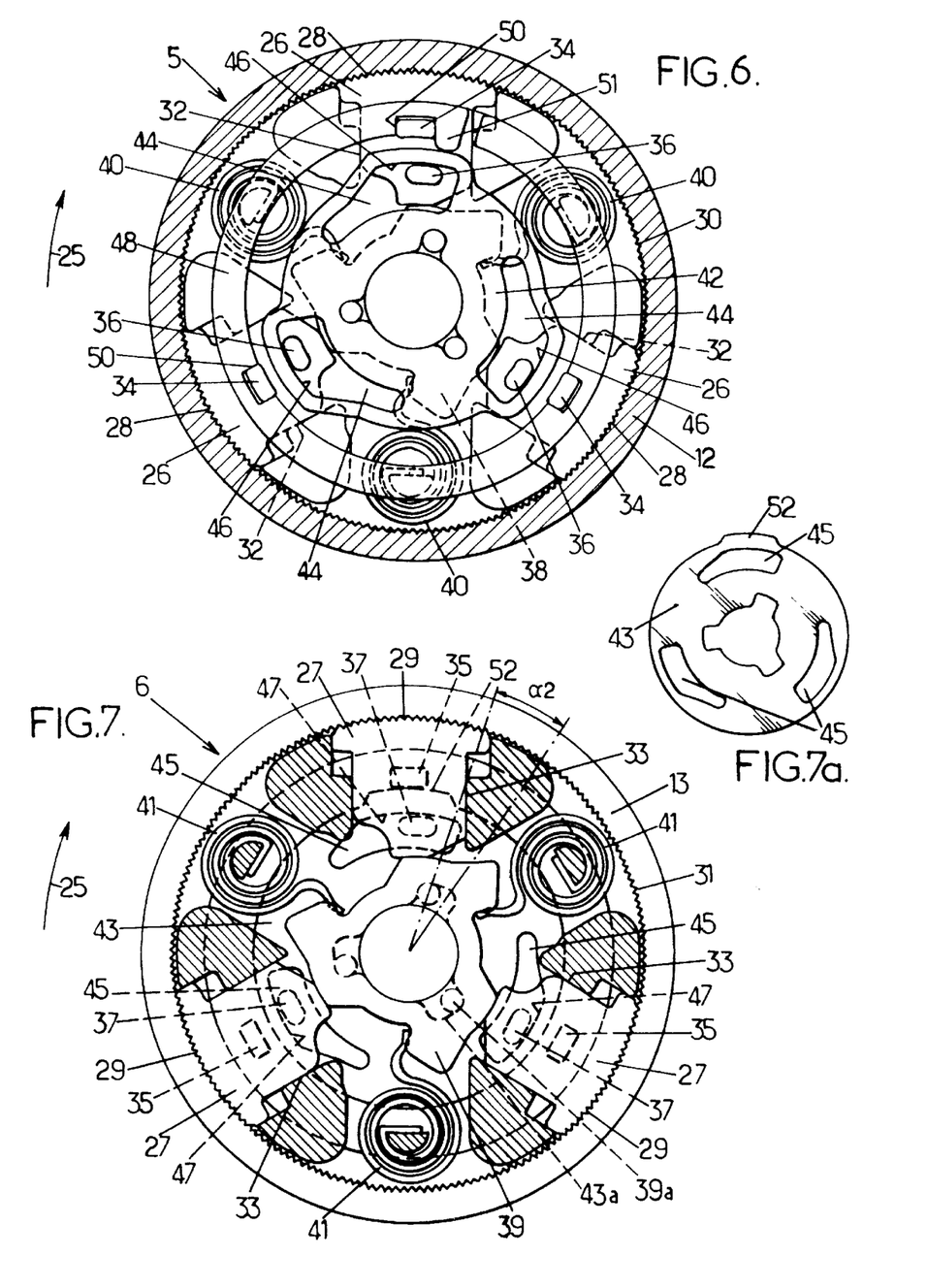
FIGS. 6 and 7 are section views respectively on lines AA and BB of FIG. 3, respectively showing the first and second hinges in their rest positions.
FIG. 7a is a view of rigid plate belonging to the second hinge shown in FIG. 7.

By way of example, the lost motion $\alpha_1$ can be about 18°. As shown in FIGS. 5 to 7, each of the two hinges 5 and 6 comprises:

three metal locking studs respectively referenced 26 and 27 disposed at 120° intervals relative to one another and each having a set of outwardly-directed teeth respectively referenced 28, 29 adapted to engage with a circular set of inwardly directed teeth respectively referenced 30, 31 formed in the corresponding moving cheek-plates 12, 13, with each of the slugs being mounted to slide radially in a respective guide 32, 33 itself secured to the corresponding fixed cheek-plate 10, 11, thus enabling the slugs to be movable between an engaged position in which the teeth of the slugs mesh with the teeth of the corresponding moving cheek-plates to lock the hinge, and a retracted position in which the slugs do not co-operate with the teeth of the moving cheek-plate, each slug also having a first peg, respectively referenced 34, 35, and a second peg respectively referenced 36, 37, these first and second pegs projecting axially towards the corresponding moving cheek-plate, and the two pegs on each slug being, for example, in radial alignment with the first peg 34, 35 being disposed radially outside the second peg 36, 37;

a respective metal cam 38, 39 secured to the corresponding handle 7, 8 and the corresponding bar segment 18, 19, and serving to control sliding of the slugs 26, 27;

respective springs 40, 41 mounted on the corresponding fixed cheek-plates and urging the corresponding cams 38, 39 towards rest positions in which they place the slugs in their engaged positions, said cams being capable of pivoting in the angular direction 25, thereby allowing the slugs to slide towards their retracted position, thereby releasing the corresponding hinge; and a respective rigid metal plate 42, 43 tied to the corresponding cam 38, 39 and extending radially between said cam and the corresponding moving cheek-plate while partially overlying the slugs, said plate having three cutouts respectively referenced 44, 45 in which the second pegs 36, 37 of the slugs are engaged, with each of these pegs co-operating with a respective camming edge 46, 47 defining the radially outer side of the corresponding cutout and shaped to co-operate with the corresponding second peg 36, 37 so as to move the corresponding slug 26, 27 radially inwards when the cam 38, 39 turns in the direction 25.

In addition, as shown in FIG. 6, the first hinge 5 has the following particular features:

the plate 42 is secured in rigid manner to the cam 38;

a radially-split resilient metal ring 48 is received in a housing 49 (FIG. 3) of the moving cheek-plate 12 while being compressed elastically in a radial direction;

the resilient ring 48 has three notches 50 which open out radially inwards and which form radial guides in which the first pegs 34 of the slugs can slide radially, substantially without play in the circumferential direction; and the resilient ring 48 also has an internal abutment 51 projecting radially inwards and extending one of the side edges of one of the notches 50 on that side of the notch which is disposed in the angular direction 25.

In addition, as shown in FIG. 7, the second hinge 6 has the following particular features:

the rigid plate 43 is mounted with a certain amount of angular lost motion on the cam 39 (for example the cam 39 may have studs 39a which project axially towards the plate 43 and which penetrate, with lost motion, into notches 43a of said plate), such that said plate 43 can be moved relative to the cam between first and second relative angular abutment positions separated from each other by a certain amount of angular lost motion $\alpha_2$, e.g. equal to 15°;

the plate 43 includes a projection 52 which acts on the first peg 35 of one of the slugs 27 so as to hold said slug in the engaged position while the second hinge 6 is in the rest position, said projection having sloping ends that form ramps enabling the corresponding slug 27 to be moved from its retracted position to its engaged position when the projection 52 comes back into register with the corresponding first peg 35 after being offset relative thereto;

the first pegs 35 of the other two slugs 27 do not co-operate with the plate 43 (these two pegs 35 could, where appropriate, be omitted); and the cutout 45 which is located in correspondence with the projection 52 is shaped to avoid urging the corresponding second peg 37 radially inwards so long as said projection 52 is in register with the corresponding first peg 35.

The seat as described above operates as follows.

Figure 8:
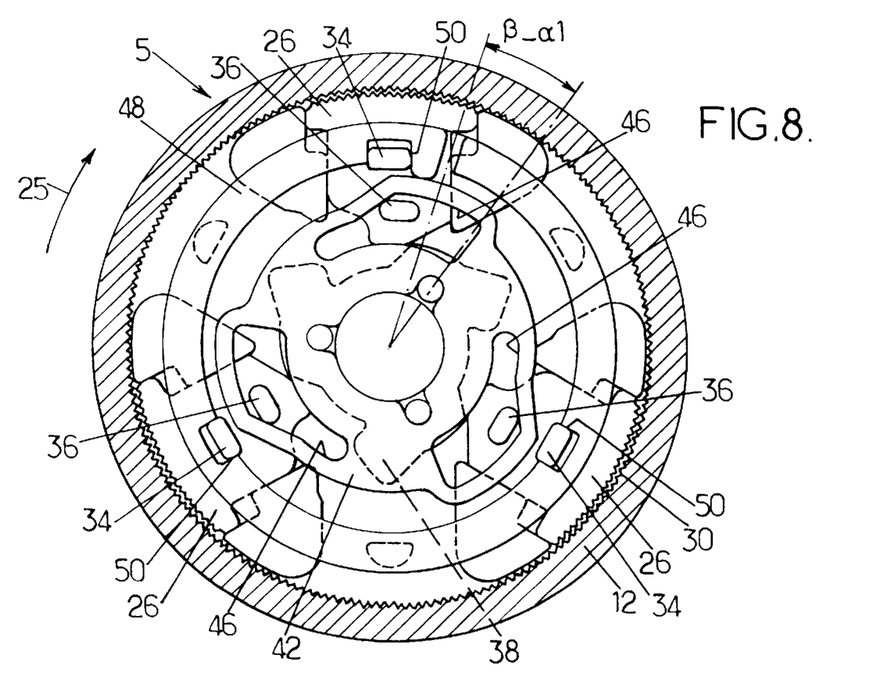
FIGS. 8 and 9 are views similar to FIGS. 6 and 7, showing the first and second hinges respectively when the control member of the second hinge is actuated, the springs of the first hinge being omitted from FIG. 8.
Figure 9:
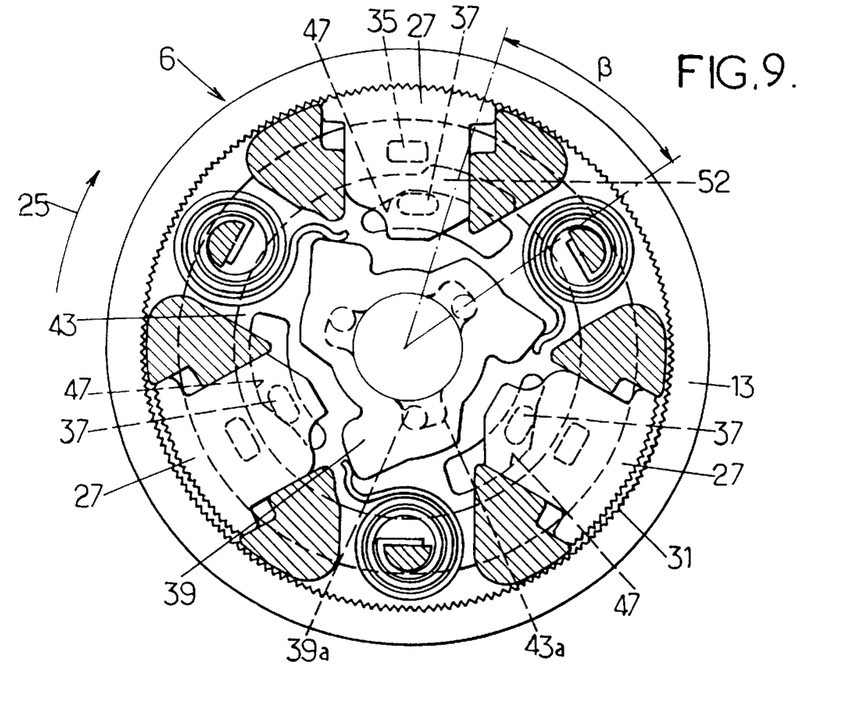

When the passenger in seat 1 seeks to adjust the inclination of the seat-back 4, the handle 8 should be actuated so as to cause it to turn in angular direction 25, thereby putting the two hinges 5 and 6 into the positions shown in FIGS. 8 and 9.

During this movement, the cam 39 of the second hinge begins by travelling through its angular lost motion U2 relative to the corresponding rigid plate 43, such that this plate is in its second angular position relative to the cam 39, after which the plate 43 is in turn driven in angular direction 25.

The edges of cam 47 that do not correspond to the projection 52 then act initially on the second pegs 37 of the corresponding slugs 27, moving the slugs into the retracted position.

Thereafter, when the handle 8 and the cam 39 have turned through an angle β that may be equal to about 36°, for example, the projection 52 is no longer in register with the first peg 35 of the corresponding slug 27 and the camming edge 47 corresponding to the projection 52 begins to act on the second peg 37 of the same slug, thereby causing this slug 27 in turn to take up its retracted position, thus unlocking the second hinge 6.

Also, at the beginning of actuation of the handle 8, the bar segment 19 and the plate 23 begin by turning in angular direction 25, travelling through the above-mentioned lost motion $\alpha_1$, until the second ends of the oblong slots 24 come into abutment against the drive fingers 22, such that the bar segment 18, the cam 38 of the first hinge 5, and the handle 7 are in turn driven in direction 25.

The camming edges 46 of the plate 38 then act on the second pegs 36 of the various slugs 26, moving said slugs into the retracted position, such that the first hinge S is also unlocked.

The passenger in the seat can then adjust the inclination of the seat-back 4 by acting directly on said seat-back, e.g. by pushing it backwards, or on the contrary by allowing it to come forwards under drive from one or more springs inside the seat-back (not shown).

As can be seen in FIG. 8, because of the angular lost motion existing between the first and second bar segments 18 and 19, the cam 38 and the mask 42 of the first hinge pivot through an angle of only $\beta-\alpha_1$ when the second hinge 6 unlocks: this pivot angle is sufficient to move the slugs 26 into the retracted position, but it is not sufficient for the first pegs 34 of said slugs to be capable of disengaging from the notches 50 belonging to the resilient ring 48.

In addition, even if the handle 8 is moved all the way to abutment, e.g. through an angular stroke $\gamma_3$ of about 45°, the pegs 34 remain in their notches 50, and the cam 38 will then have turned through only $\gamma_3-\alpha_1$.

While the inclination of the seat-back 4 is being adjusted, the resilient ring 48 is thus held stationary by the first pegs 34 of the slugs 26 and the moving cheek-plate 12 turns while rubbing against the resilient ring 48.

In addition, when it is desired to fold the seat-back 4 down forwards as far as it will go, into the position shown in chain-dotted lines in FIG. 1, e.g. to give access to the back seats of the vehicle if the vehicle is a three-door vehicle, then the handle 7 is actuated in angular direction 25, thereby moving not only the cam 38 but also the cam 39 in said direction 25.

Figure 10:
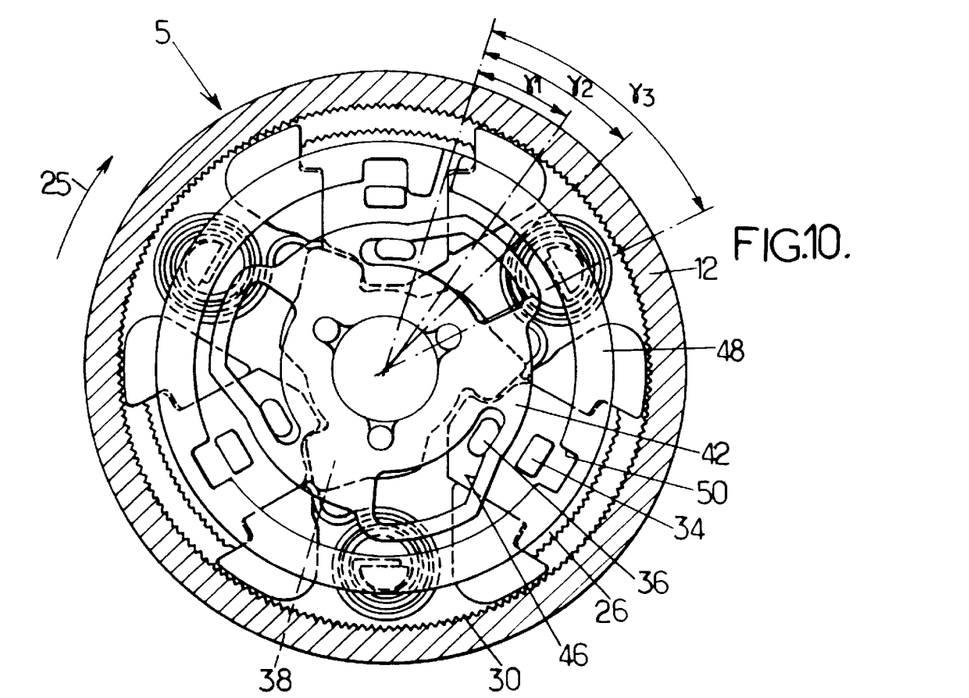
FIG. 10 is a view similar to FIG. 6, showing the first hinge during actuation of its control member.

During this movement, as shown in FIG. 10, the camming edges 46 of the plate 42 act initially on the second pegs 36 of the slugs 26 to release the first hinge 5 after the handle 7 has travelled through a certain angular stroke $\gamma_1$, e.g. equal to about 18°.

After a certain total angular stroke $\gamma_2$ of the handle 7, e.g. equal to about 30°, the camming edges 46 have moved the slugs 26 radially inwards far enough to disengage the first pegs 34 of said slugs from the notches 50.

Finally, the movement of the handle 7 may possibly continue further, to a total angular stroke which may, for example, be equal to the above-mentioned stroke $\gamma_3$ and which may be equal to about 45°, for example, thus reaching the position shown in FIG. 10.

During this movement, in the second hinge 6, the slugs 27 that do not correspond to the projection 52 are initially unlocked, and then the slug 27 which corresponds to the projection 52 is in turn unlocked when the cam 39 has turned with the handle 7 through the above-mentioned angle β which lies between the angles $\gamma_2$ and $\gamma_3$.

This last slug 27 therefore unlocks only after the first pegs 34 have left their notches 50.

The seat-back 4 can then be folded down forwards as far as it will go, being pushed by a user or under the action of springs inside the seat-back.

Figure 11:
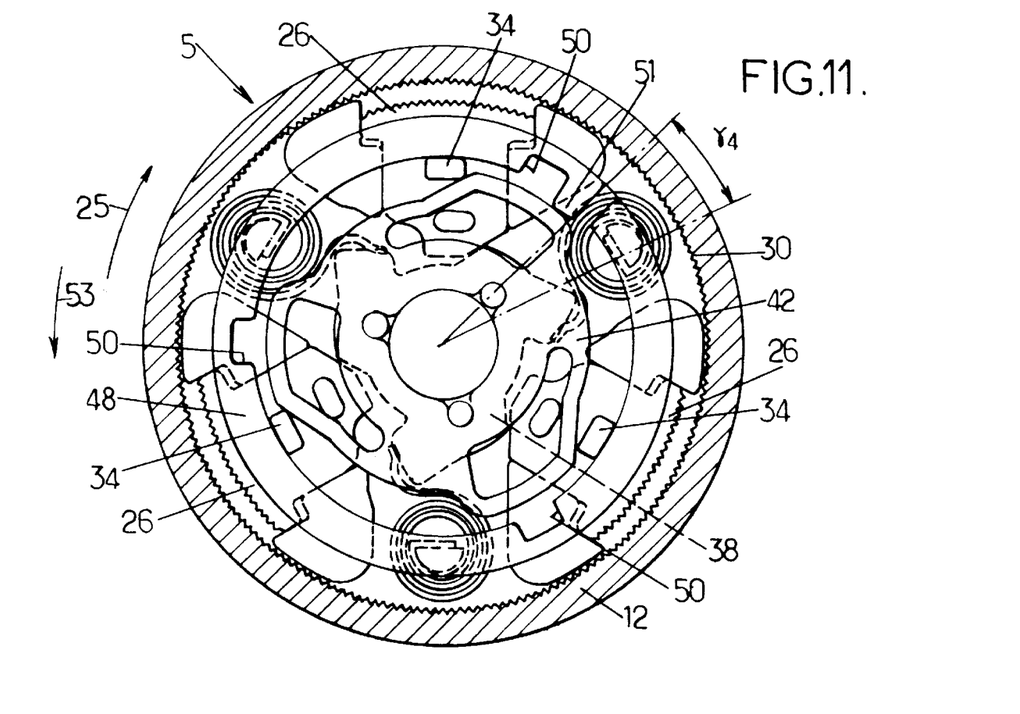
FIGS. 11 and 12 are views similar to FIGS. 6 and 7 showing the first and second hinges respectively when the seat-back is folded down forwards after releasing the control member of the first hinge.

During this movement, the resilient ring 48 is driven by friction together with the moving cheek-plate 12 so as to follow the pivoting of the seat-back, as shown in FIG. 11: the resilient ring thus memorizes the most recent inclination adjustment of the seat.

Once the seat-back has begun to move down forwards, the user can release the handle 7 since the slugs 27 are then held in the released position by bearing against the inside edge of the resilient ring 48.

Figure 12:
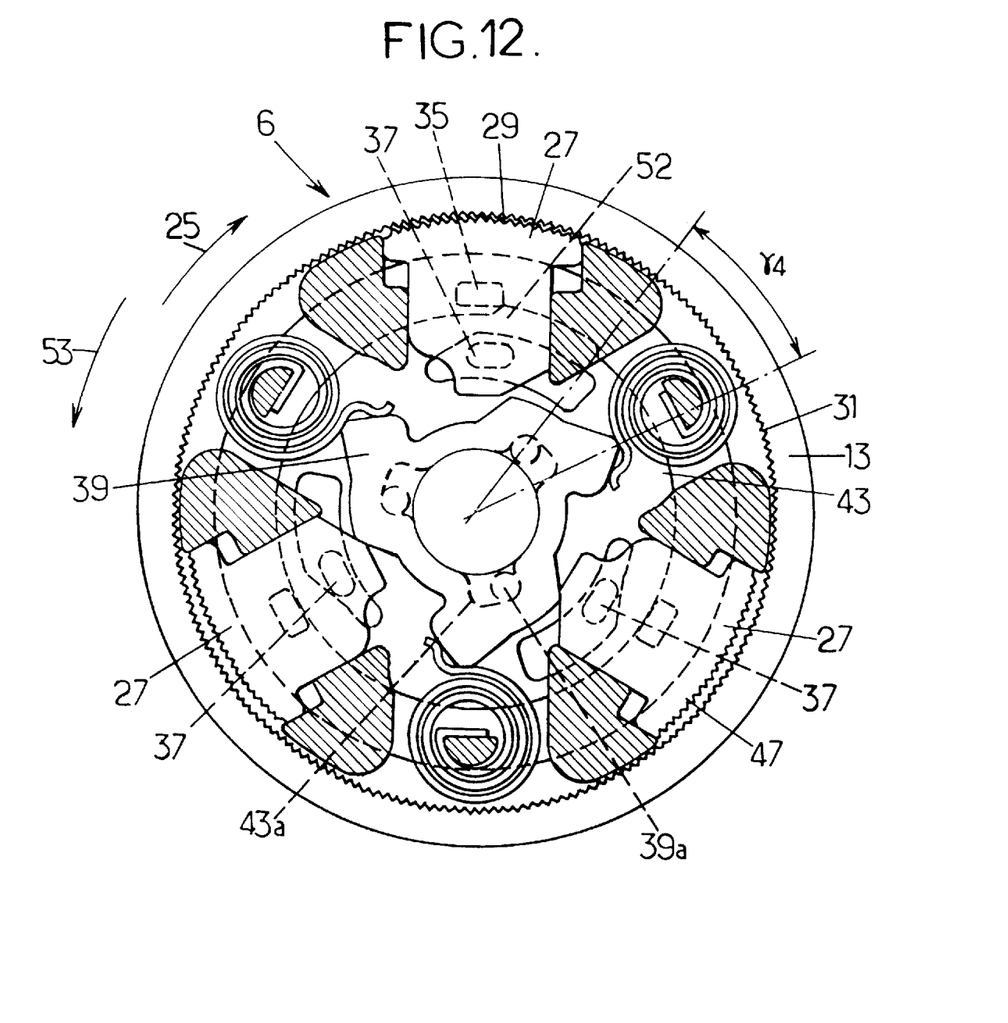

In this situation, as shown in FIGS. 11 and 12, the cams 38 and 39 are subjected to a small amount of reverse movement in the direction 53 opposite to the direction 25 over a certain angular stroke $\gamma_4$ which may, for example, be equal to about 18°, until an element secured to the cam 38 comes into abutment against the slugs 26.

By way of example, the outer periphery of the rigid plate 42 may come angularly into abutment against the first pegs 34 of the slugs 26 while also urging said first pegs 34 radially outwards by the camming effect, and/or a portion of the cam 38 may itself also come into angular abutment against the rear ends of the slugs 26 while urging said slugs radially outwards.

Because of the angular lost motion which exists between the cam 39 and the rigid plate 43 of the second hinge 6, the cam 39 initially moves on its own in the direction 53 while the plate 43 remains substantially stationary because of its friction against the moving cheek-plate 13, after which said cam 39 may possibly drive the plate 43 over a small angular stroke $\gamma_4-\beta_2$ (specifically about 3° in the particular example described herein).

This small reverse movement of the plate 43 is insufficient to bring the slugs 27 into the engaged position, so the hinge 6 remains in the unlocked position.

In addition, in this situation, the projection 52 on the plate 43 is in the immediate vicinity of the first peg 35 of the corresponding slug 27.

This slug 27 is disposed to slide vertically with its teeth 29 pointing upwards, such that said slug 27 then remains in the retracted position under the effect of gravity.

When the user raises the seat-back 4 after it has been folded down forwards, the resilient ring 51 pivots in angular direction 53 together with the moving cheek-plate 12 of the hinge 5, until the abutment 51 comes into contact with the corresponding first peg 34.

At this moment, the first pegs 34 of the three slugs 26 of the first hinge are in register with the corresponding notches 50 and they penetrate into said notches under drive from the cam 38.

Also, at the very beginning of this movement of the slugs 26, and before the first pegs 34 become positively engaged in the notches 50, the projection 52 of the second hinge 6 pushes back the first peg 35 of the corresponding slug 27, thereby putting said slug 27 back into the engaged position, and thus preventing any loss of adjustment of the inclination of the seat-back.

Both hinges 5 and 6 then return to the rest position, such that the seat-back 4 is again locked with its inclination being in its initially-adjusted position.

In a variant, it may be observed that it is possible to provide for the maximum angular stroke $\gamma_3$ of the handle 8 to be smaller than the angular stroke $\gamma_2$ required for the cam 38 to disengage the pegs 34 from the notches 50.

Under such circumstances, the mechanical link with lost motion 9 needs to be adapted to drive the cam 39 only after a certain amount of angular lost motion of the cam 38 when said cam 38 is moved by the handle 7 from its rest position, and the angular stroke $\gamma_2$ needs to be smaller than the sum of the maximum angular strokes of the handle 7 and of said angular lost motion.

In addition, it is also possible to provide for all or some of the slugs 27 to be returned to the engaged position simultaneously by the cam 39 before the first pegs 34 become positively engaged in the notches 50 during re-locking.

We claim:

1. A vehicle seat having first and second sides and comprising both a seat proper and a seat-back pivotally mounted relative to the seat proper by means of a hinge mechanism, said mechanism comprising a first hinge which is disposed on the first side of the seat and which comprises:

first and second cheek-plates, one secured to the seat proper and the other to the seat-back, the cheek-plates being mounted to pivot relative to each other about an axis of rotation, the second cheek-plate of the first hinge being permanently secured to a first set of teeth extending over at least an arc of a circle centered on the axis of rotation and being radially inwardly directed;

at least a first slug movably mounted on the second cheek-plate of the first hinge and provided with a set of teeth suitable for meshing with the first set of teeth, said first slug being guided in radial sliding relative to the first cheek-plate of the first hinge, between an engagement position where the set of teeth on the first slug meshes with the first set of teeth to lock the first hinge, and a "disengaged" position where the first slug does not mesh with said first set of teeth, said first slug further including a first peg projecting axially towards the second cheek-plate of the first hinge;

a first cam movably mounted relative to the second cheek-plate of the first hinge for controlling the sliding of the first slug, said first cam being urged by resilient means towards a rest position in which said first cam places said first slug in its engaged position;

a first control member connected to the first cam for moving said first cam over a first angular stroke from its rest position to a first actuation position in which said first cam enables the first slug to slide towards its disengaged position; and a circular guide mechanically linked with the second cheek-plate of the first hinge and abutting against the first peg of the first slug so as to maintain said slug positively in its disengaged position when said first slug is in a predetermined range of angular positions relative to said circular guide, said circular guide having at least one gap in which the first peg of the first slug can engage when said first slug is not in said predetermined range of angular positions, then allowing said first slug to slide radially outwards to its engaged position;

wherein the circular guide is formed by a rim belonging to "memory" equipment which is mounted in the second cheek-plate of the first hinge to pivot with friction about the axis of rotation, the gap of the circular guide forming a radial guide in which the first peg of the first slug can slide radially, substantially without play in a circumferential direction;

wherein the hinge mechanism further comprises a second hinge disposed on the second side of the seat and comprising:

first and second cheek-plates, one secured to the seat proper and the other to the seat-back, said cheek-plates being mounted to pivot relative to each other about the above-mentioned axis of rotation, the second cheek-plate of the second hinge being permanently secured to a second set of teeth which extends over at least an arc of a circle centered on the axis of rotation and which is radially inwardly directed;

at least one second slug provided with a set of teeth suitable for meshing with the second set of teeth, said second slug being guided in radial sliding relative to the first cheek-plate of the second hinge, to slide between an engaged position where the set of teeth of the second slug meshes with the second set of teeth to lock the second hinge, and a retracted position where the second slug does not mesh with the second set of teeth;

a second cam for controlling sliding of the second slug, said second cam being urged by resilient means towards a rest position in which said second cam places said second slug in its engaged position; and a second control member connected to the second cam for displacing the second cam over a second angular stroke from its rest position towards an actuation position in which said second cam enables the second slug to slide towards its retracted position;

wherein the first and second cams are interconnected via a lost motion mechanical link comprising two link members which are respectively connected to the first and second cams and which mesh with one another by mutual rotational abutment, the first and second link members enabling their first and second cams to be in their rest positions in the absence of the first and second control members being actuated, said first and second link members meshing by rotational abutment for driving the second cam to its actuation position when the first cam is moved from its first actuation position by the first control member, and said first and second link members meshing by rotational abutment for driving the first cam from its rest position to a second actuation position over a third angular stroke that is smaller than the first angular stroke when said second cam is displaced by the second control member from its rest position to its actuated position; and wherein the first and second cams are linked respectively to first and second rigid plates which extend radially respectively between said cams and the corresponding second cheek-plates respectively overlapping at least in part the first and second slugs, each of the first and second slugs including a respective "second" peg projecting axially towards the corresponding second cheek-plate and penetrating into a cutout formed in the corresponding second cheek plate, the cutouts of the first and second rigid plates being respectively defined in a radially outward direction by first and second camming edges each engaging with the corresponding second peg so as to displace the first and second slugs respectively radially inwards when the first and second cams are actuated.

2. A seat according to claim 1, in which the second cam is mounted in the second hinge so as to travel at most over a fourth angular stroke when it is actuated by the second control member, said fourth angular stroke being not less than the first angular stroke, and the lost motion mechanical link being adapted to entrain the first cam only after the second cam has traveled through a certain angular stroke referred to as the angular lost motion when said second cam is displaced by the second control member from its rest position, the first angular stroke being greater than the difference between the fourth angular stroke and the angular lost motion.

3. A seat according to claim 1, in which the second cam is mounted in the second hinge so as to travel at most over a fourth angular stroke when it is actuated by the second control member, said fourth angular stroke being smaller than the first angular stroke, and the lost motion mechanical link being adapted to drive the second cam only after the first cam has traveled through a certain angular stroke referred to as angular lost motion when said first cam is displaced by the first control member from its rest position, the first angular stroke being smaller than the sum of the fourth angular stroke plus the angular lost motion.

4. A seat according to claim 1, in which the memory equipment comprises a resilient ring which is clamped radially in the second cheek-plate of the first hinge.

5. A seat according to claim 1, in which the second angular stroke is greater than the first angular stroke, the mechanical link having lost motion being adapted so that during actuation of the first control member the first cam travels over its first angular stroke from its rest position before the second cam has travelled over its second angular stroke.

6. A seat according to claim 5, in which the second rigid plate includes a projection which is able to engage the second slug by camming action in order to replace said second slug in its engaged position, said projection being adapted for replacing the second slug in its engaged position before the first-peg of the first slug re-engages in its radial guide when the seat-back is raised after being folded down by acting on the first control member.

7. A seat according to claim 1, in which an element secured to the first cam is designed to come into abutment against the first slug when the first slug is in its disengaged position and the first control member is released, in such a manner as then to prevent said first cam from returning to its rest position, said element being adapted then to urge the first slug radially outwards so as to enable the first peg of said slug to engage in its radial guide when the seat-back is raised after having been folded down by acting on the first control member.

8. A seat according to claim 1, in which the second slug includes a first peg projecting axially towards the second cheek-plate of the second hinge, the second rigid plate including a projection projecting radially outwards and engaging with the first peg of the second slug to hold said second slug in its engaged position so long as the first cam lies in a range of angular positions that do not correspond to the disengaged position of the first slug, said projection also being shaped so as to push the first peg of the second slug back radially outwards by camming effect, thereby placing the second slug back in its engaged position before the first peg of the first slug again engages in its radial guide when the seat-back of the seat is raised after being folded down by actuating the first control member.

9. A seat according to claim 8, in which the second rigid plate is linked to the second cam with a certain amount of angular lost motion in such a manner that said second plate can be moved relative to the second cam between first and second relative angular positions, the second rigid plate being in its first angular position relative to the second cam when said second cam is in its rest position, and said second plate being firstly held fixed by friction until said second rigid plate is in its second angular position relative to the second cam on each occasion that said second cam is displaced from its rest position towards its actuation position.

10. A seat according to claim 9, in which an element secured to the first cam is provided to come into abutment against the first slug when said first slug is pressed against the circular guide of the first hinge, and when the first control member is released, thereby preventing said second cam from then returning fully into its rest position, but allowing said first cam to move through a fifth angular stroke towards its rest position, said element secured to the first cam also urging the first slug radially outwards, and the fifth angular stroke being adapted so that when the first cam travels through said fifth angular stroke:

the second cam takes up the lost motion between said second cam and the second plate so as to place said second plate in its first angular position relative to the second cam; and the second cam also brings the projection of the second plate substantially in contact with the first peg of the second slug.

11. A seat according to claim 10, in which the second slug slides vertically with its set of teeth being upwardly directed, said second slug being held merely by gravity in its retracted position when the first peg of the first slug is pressed against the circular guide of the first hinge, after the first control member has been released.

12. A seat according to claim 11, in which the second hinge includes at least one slug in addition to said second slug, said additional slug also having a set of teeth adapted to mesh with the second set of teeth and being radially displaceable between an engaged position in which it engages said second set of teeth and a retracted position in which it does not mesh with said second set of teeth, the additional slug having a peg which projects axially towards the second cheek-plate of the second hinge and which penetrates into an additional cutout formed in the second rigid plate, said additional cutout being defined radially outwards by a camming edge which engages the peg of the additional slug to displace said peg radially inwards when the second cam is displaced towards its actuation position, the camming edge of the additional cutout being adapted to hold the additional slug positively in the retracted position while the first peg of the first slug is pressed against the circular guide of the first hinge after the first control member has been released, and the second rigid plate does not have an additional outer projection for engaging the additional slug.

13. A seat according to claim 1, in which the memory equipment has an abutment projecting radially inwards in register with the radial guide in which the first peg of the first slug slides, said abutment being disposed on one side only of said radial guide so that when the first slug is in its disengaged position, the seat-back can be folded down forwards and then lifted back up until the first peg of the first slug comes in contact with said abutment, after which said first peg can again engage in its radial guide.

* * * * *